Figure 1:
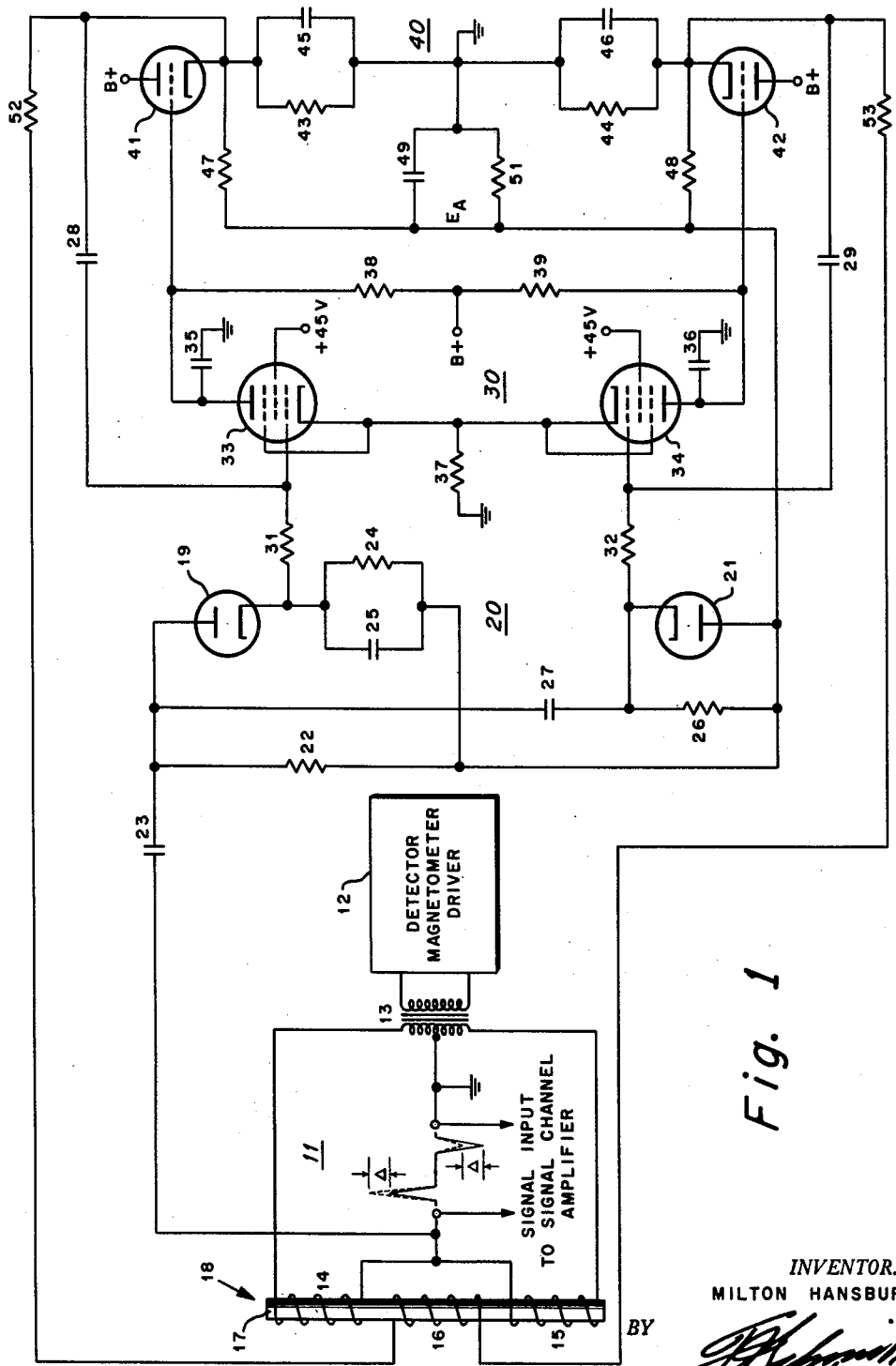

United States Patent Office 2,938,164
Patented May 24, 1960

2,938,164

AUTOMATIC EARTH FIELD BALANCE CONTROL SYSTEM FOR MAGNETOMETERS

Milton Hansburg, Phoenix, Ariz., assignor to the United States of America as represented by the Secretary of the Navy Filed June 25, 1957, Ser. No. 668,000

9 Claims. (Cl. 324—43)

(Granted under Title 35, U.S. Code (1952), sec. 266)

The invention described herein may be manufactured and used by or for the Government of the United States of America for governmental purposes without the payment of any royalties thereon or therefor.

The present invention relates to an automatic earth's field balance control system for magnetometers and more particularly to an automatic earth's field balance control system for magnetometers in which the earth's ambient magnetic field is effectively canceled.

In order to render a detecting element in a magnetometer instrument significantly sensitive to the present of magnetic anomalies, it is particularly desirable that the ambient magnetic field of the earth be canceled. Existing manually controlled means for achieving cancellation of this field in a detecting element of a magnetometer necessitate in general a determination of the magnitude of the constant component of the earth's magnetic field, involving manual and mental operations on the part of the operator, since a biasing source is manually adjusted to provide a magnetic flux having an amplitude and sense to effect cancellation of the earth's magnetic field within the detecting element. Existing biasing means as denoted are deficient for the reason that the bias must be constantly monitored and adjusted manually as the magnetic field gradient changes from one locale to another. Further, a serious limitation is imposed on detection apparatus installed for operation in an aircraft, or other dirigible craft, since by the time an operator finishes making a determination of the magnetic field gradient of the earth at a particular location, the aircraft has traveled a considerable distance from that point.

Apropos of the prior art deficiencies and limitations, the instant invention provides an earth field balance control which is automatic in operation, permitting the operator to devote his full attention to observing the magnetic anomaly responses of the magnetometer instrument proper. In essence, the basic structure of the inventive automatic earth's field balance control system for magnetometers combines a rectifier circuit of a type especially adapted for use with signals obtained in the output of a detector magnetometer bridge with an earth field balance (EFB) amplifier, essentially a negative feedback amplifier. These signals are rectified and converted into suitable D.C. output voltages via a low-pass RC filter for application to the EFB amplifier, the output voltage of which is applied to a cathode follower, which in turn supplies a current to a coil of the detector magnetometer element in proper amplitude and polarity for cancellation of the earth's field. The manner in which automatic earth's field balance control functions may be likened to the operation of any feedback amplifier or servo-system wherein the output is fed back to the input stage in opposition to the input signal. Thus, the provision of an automatic earth field balance control system in a magnetometer as herein summarily described overcomes the enumerated limitations and defiencies of existing systems substantially enhancing the operation of a magnetometer instrument incorporating the inventive apparatus.

An object of the invention is the provision of an earth field balance control system in a magnetometer wherein cancellation of the earth's ambient magnetic field is continuously automatically performed.

Another object of the present invention is the provision of an automatic earth field balance control system in a magnetometer so that an operator is relieved of the necessity of performing mental and manual operations in canceling the earth's magnetic field, permitting the operator to devote his full attention to the discernment of magnetic anomaly signals.

A further object of the invention is the provision of an automatic earth field balance control system in a magnetometer having a favorable frequency band-pass for passage of magnetic anomaly signals such as the response from a submarine, but rejects interfering magnetic noise signals, which originate in geological formations and as a result of aircraft maneuvers.

Still another object is to provide an automatic earth field balance control system in a magnetometer wherein the characteristic signal obtained in the output of a magnetometer bridge may be properly assimilated to effect cancellation of the earth's magnetic field.

A final object of the present invention is the provision of an automatic earth field balance control system in a magnetometer, which thereby is rendered capable of continual use without constant readjustment for changes in geographical location or local conditions, peculiar to the vehicle containing the invention apparatus.

Figure 2:
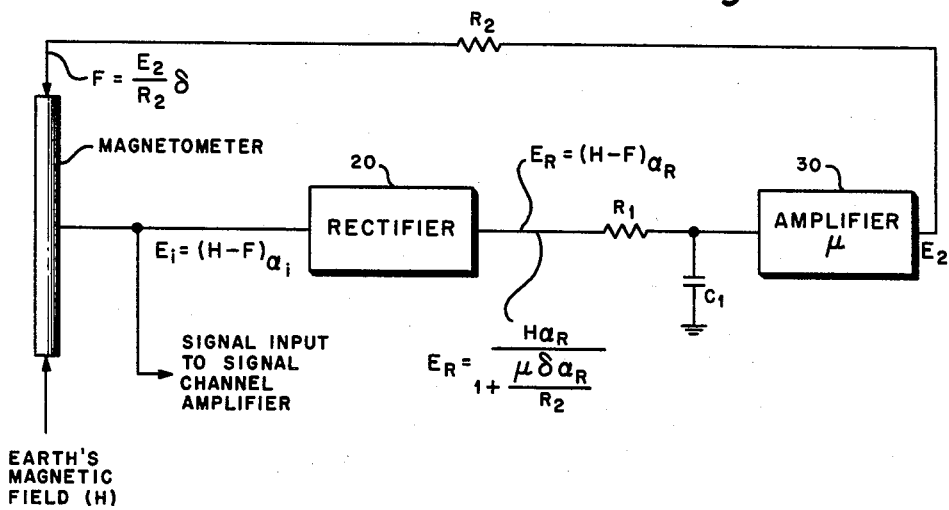
Figure 3:
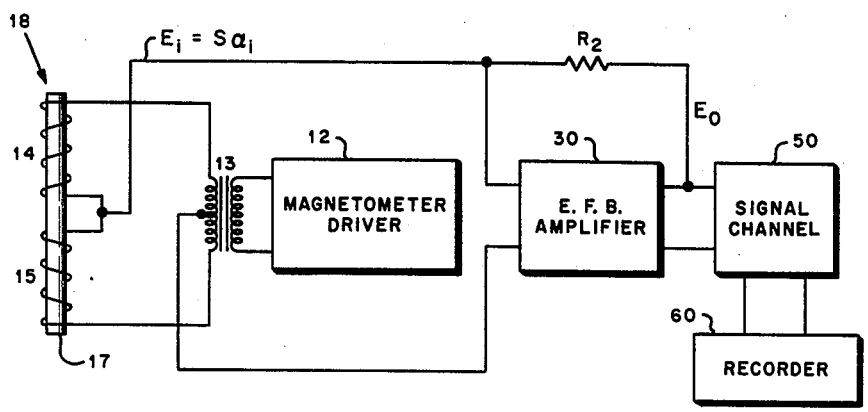

The exact nature of this invention as well as other objects and advantages thereof will be readily apparent from consideration of the following specification relating to the annexed drawing in which:

Fig. 1 is a diagrammatic presentation of an illustrative embodiment of the inventive apparatus, Fig. 2 is a schematic block diagram of the illustrative embodiment shown in Fig. 1 and is presented herein for purpose of setting forth pertinent theoretical considerations essential to the construction of a satisfactory functional embodiment, and Fig. 3 is a semi-schematic block diagram of an alternative embodiment of the inventive apparatus.

Referring now to the drawings in which like numerals refer to like or corresponding parts throughout the several views, in Fig. 1 is shown a diagrammatic presentation of the illustrative inventive means for achieving automatic earth field balance control in a magnetometer. Numeral 11 generally designates a detector magnetometer bridge which is conjunction with the magnetometer driver 12 and drive transformer 13 are normally integral component parts of the magnetometer instrument proper. The two magnetometer coils 14 and 15 together with the two halves of the center-tap secondary of the drive transformer 13 constitute the four arms of a bridge with the output load taken between the two center-taps as indicated. A bias or earth field balance (EFB) coil 16, receiving its input from the earth's field balance channel, provides cancellation of the earth's magnetic field, thus yielding nulled D.C. magnetic conditions within a magnetically saturable strip 17, usually of permalloy. A sinusoidal drive voltage deriving from detector magnetometer driver 12 and of a suitable arbitrary frequency, such as, for example, 700 cycles used in the inventive apparatus, is supplied from drive transformer 13 to provide two alternating magnetic fields of opposite polarity to the two halves of the permalloy strip, and it is of sufficient amplitude to drive the strip in and out of saturation in both directions. An instantaneous representation of the magnetometer pulses or "spike" signals obtained in the output of the bridge is shown in Fig. 1 for the balanced or null condition thereof, and for a mode during which the bridge is momentarily unbalanced. The detector magnetometer bridge is balanced when its output is a symmetrical spike signal as portrayed by the representative wave form in solid black outline. Conversely, a bridge unbalance is indicated by a spike output signal that is asymmetrical, as shown in dotted outline, for a condition when the earth's ambient magnetic field has incrementally increased. It will be observed that the character of the signal is such that the incremental positive increase in amplitude is exactly offset by the incremental negative decrease in amplitude. This total peak-to-peak change in signal amplitude is directly proportional to changes in the magnetic field strength, sensed by the detector magnetometer element 18. Moreover, it is to be understood that for a condition when the earth's ambient magnetic field incrementally decreases, the spike signal is generated in a reciprocal manner, that is, the incremental increase in negative amplitude is precisely offset by the incremental decrease in positive amplitude. Since the explicit operation of the detector magnetometer bridge 11, utilizing a saturable permalloy strip 17, is conventional and well known in the art, the delineation with respect to the character of the detector magnetometer signal set forth above is deemed sufficient. In addition, the apparatus for orienting the longer axis of element 18 coincident with the earth's magnetic flux line is not illustrated, since such apparatus is well-known and it is not a part of this invention. Detecting element 18 should be understood as being substantially aligned to respond to the total magnetic field vector.

The distinctive spike signal output of the detector magnetometer bridge 11 will be observed in Fig. 1 to be applied in parallel to a rectifier circuit 20 of push-pull variation comprising diodes 19 and 21, and to the usual signal channel amplifier of the magnetometer instrument proper. RC coupling is employed, load resistor 22 and capacitor 23 forming a long RC time constant compared with the period of the input signal. Diode 19 in conjunction with the RC circuit, cathode resistor 24 and capacitor 25, acts as a peak detector upon the positive spikes of the input signal to yield a positive D.C. voltage proportional in amplitude and polarity to the incoming positive spikes. Diode 21 in conjunction with an RC circuit consisting of resistor 26 and capacitor 27, functions as a clamper to clamp the tip of the negative spike signal to ground, thus yielding at the cathode of diode 21 the original spike signal with its baseline raised above ground potential an amount proportional to the negative amplitude of the spike signal. Thus, at the cathode of each of diodes 19 and 21 appears a positive D.C. signal which is proportional to the absolute amplitude of the spikes. Suitable filtering is imparted to the respective signals, which thereby lose their spike character. This filtering is respectively performed in each instance by an RC filter comprising capacitor 28 and resistor 31, and counterpart elements 29 and 32. The capacitive elements, 28 and 29, in addition function to supply an appropriate negative feedback. Therefore, at the input to the earth field balance amplifier 30 comprising in a push-pull arrangement pentodes 33 and 34, appears positive D.C. voltage levels which vary according to the unbalance present in the detector magnetometer bridge.

The earth field balance amplifier 30 illustrated in Fig. 1 is of conventional push-pull type, especially adapted for direct current amplification. A common cathode resistor 37 provides the required bias for pentodes 33 and 34, in addition to imparting circuit stability by rejecting "in-phase" voltages appearing at the pentode grids. Plate load resistances 38 and 39 are respectively bypassed by capacitors 35 and 36, which serve to decrease the loop gain of the system at high frequencies sufficient to prevent oscillation from occurring. Direct coupling is employed between amplifier 30 and the push-pull cathode follower stage 40, requiring a quiescent operating potential of approximately 95 volts to be developed at each cathode of triodes 41 and 42 for a zero ambient field condition.

Circuit requirements thereupon dictate that this voltage be variable within ±25 volt limits to permit cancellation of magnetic fields having magnitudes from zero to a maximum of 70,000 gammas. Thus, a provision of cathode resistors 43 and 44 is that this range of voltage be developed therein, commensurate with the development of a quiescent potential as noted to maintain class A operation in the push-pull cathode follower stage. Capacitors 45 and 46 bypass the spike signal, induced into the EFB coil from the detector magnetometer bridge, and prevents its entering into a negative feedback circuit, comprised of resistors 47 and 48 in conjunction with capacitor 49 in parallel with resistor 51 to ground. Substantial circuit stability is achieved with respect to anomalous changes in spike signal amplitudes and variation in tube characteristics by causing the rectified voltage of diodes 19 and 21 to be developed with respect to a D.C. voltage level $E_A$, developed across capacitor 49 and resistor 51. Thus, the amplification of the voltage level $E_A$ to rectifier circuit 20 in a manner as illustrated in Fig. 1 contributes to greater stability of operation. The low impedance output of the push-pull cathode follower is thence applied through current limiting resistors 52 and 53 in proper amplitude and polarity to the EFB coil of the detector magnetometer bridge for cancellation of the magnetic field.

Referring to Fig. 2, an analysis of the EFB control system as it relates to the showing in Fig. 1 is presented. A detailed consideration of the gain requirement of the EFB amplifier is initially set forth and an analysis of the bandpass characteristics thereof is given subsequently. It is deemed that the amplifier gain must be sufficient to permit cancellation of the largest magnetic field encountered (70,000 gammas) and the smallest (0 gamma) with a change in spike unbalance not exceeding 20% of the peak-to-peak spike amplitude. A D.C. analysis of the EFB control system with respect to this design premise yields a relationship between the rectified input signal $E_R$ present at the input of amplifier 30 and the earth's magnetic field H for which cancellation by an opposition flux F is required as follows:

$$(1) \quad E_R = \frac{H\alpha_R}{1 + \frac{\mu\delta\alpha_R}{R_2}}$$

The definitions and the values of the terms for Equation 1 and related expressions indicated in Fig. 2 are as follows:

$\alpha_R$ = the conversion factor relating rectified low frequency signal voltage and the input magnetic signal. Its value is the product of the spike sensitivity, which is the total change in both spike heights per gamma input magnetic signal and the rectification efficiency of the diodes (approximately 50 percent).

$\alpha_R = 500\mu v$. per gamma.

$\delta$ = the EFB bias coil conversion factor which relates the EFB current output and the resultant magnetic field produced at the magentometer to cancel the earth's magnetic field.

$\delta = 3 \times 10^7$ gammas per ampere.
$\mu$ = electronic gain of the EFB amplifier.
$E_2$ = output voltage of the EFB amplifier.
$R_2 = 2 \times 10^4$ ohms (series resistance to EFB coils).
$H$ = earth's magnetic field (maximum value $= 7 \times 10^4$ gammas).
$F$ = flux developed by EFB control system.

A 20 percent spike unbalance for arbitrary 2 volt spikes and a 50 percent rectification efficiency, permits a maximum of 0.2 volt for $E_R$ in a 70,000 gamma magnetic field. Therefore, utilizing the values indicated above, a solution of Equation 1 for the electronic gain $\mu$ yields a value of 232. Thus, the gain afforded by the use of pentode type tubes inclusive of a cathode follower is more than sufficient.

With respect to band-pass considerations, it is operationally desirable that the band-pass of the EFB control system extend from zero frequency, necessary to cancel the earth's magnetic field, to a cut-off point, determined by the low-pass RC filter comprised of $R_1$ and $C_1$ shown in Fig. 2 and which correspond in general to elements 31, 28 and 32, 29 in Fig. 1. The frequency cut-off point in the illustrative embodiment occurs at a point sufficiently below signal frequencies falling in the range of responses received from submarines in order to insure passage of these frequencies to the signal channel amplifier of the magnetometer instrument proper. Interfering magnetic noise signals, however, such as those originating in geological formations and aircraft maneuvers, which have frequencies lying below the frequency cut-off point, are presented maximum rejection to the signal channel amplifier due to the highly degenerative feed-back applicable to these frequencies. An insight into the band-pass characteristics of the EFB amplifier may be obtained from a consideration of the following expression which affects location of the cut-off frequency point:

(2) $$\frac{E_i}{(S)\alpha_i} = \frac{P+W}{P+(W)\left(1+\frac{\mu\delta\alpha_i}{R_2}\right)}$$

where:

$E_i$ = Output signal from the magnetometer bridge or more generally the common input signal to EFB and signal channels (peak-to-peak change in spike height expressed in volts).

$\alpha_i$ = Spike sensitivity at point of common input to EFB and signal channel. Peak-to-peak change in spike heights per gamma input magnetic signal.

$\alpha_i = 10^{-3}$ volts/gamma.

$S$ = Input magnetic signal to magnetometer bridge in gammas.

$$W = \frac{1}{(R_1C_1)G}$$

where $R_1 = 2$ megohms, $C_1 = 2\mu f$.

*Note.*—In the EFB control system shown in Fig. 1, $C_1$ is placed between the pentode grid and cathode follower cathode; therefore, the effective capacity (because of the "Miller" effect) is the capacitor value multiplied by the amplifier gain (G), which exists between the pentode grid and cathode follower cathode.

$$W = \frac{1}{(2\times 2)300} \text{ (Assume } G = 300\text{).}$$

$\delta = 3\times 10^7$ gammas/ampere.
$R_2 = 2\times 10^4$.
$P = 2\pi f$.

From Equation 2, it is apparent that not only the time constant $W$ of the R-C filter but also the factors $\delta$, $\alpha_i$, and $R_2$ will affect the value of the frequency cut-off point. Using tabulated values for Equation 2 the following expression is resolved:

$$\frac{E_i}{(S)\alpha_i} = \frac{P+8\times 10^{-4}}{P+.375} = \frac{P}{P+.375}$$

Thus, an inspection of the latter expression shows that the feedback amplifier serves to interject between the magnetometer bridge and the signal channel an equivalent high-pass R-C filter, which in this case yields a 3 db point at $f = 0.06$ c.p.s., removed from the signal band-pass peak frequency, $f_o = 0.1$ c.p.s.

Fig. 3 presents a semi-schematic block diagram of an alternative embodiment of the automatic earth field balance control system illustrating in particular an arrangement in which the use of an EFB coil is omitted, in addition to performing rectification of the signal subsequent to amplification thereof in the EFB amplifier. Cancellation of the earth's magnetic field H in this instance is achieved by application of the output voltage $E_0$ of the EFB amplifier 30 in proper amplitude and sense to magnetometer coils 14 and 15. The current derived from the output voltage $E_0$ flows through the two halves of the secondary windings of driver transformer 13 in opposite directions, and flows through coils 14 and 15 in a concurrent aiding sense to produce a flux F which is equal and opposite to the earth's magnetic flux H. Thus, a circuit arrangement is presented in which the use of an EFB coil may be omitted. The input signal voltage $E_i$ thereupon undergoes conventional detection and subsequent amplification in signal channel 50, the output of which is applied a recorder 60 for discernment of the magnetic anomaly signals. Although the arrangement presented in Fig. 3 employs no EFB coil, it is deemed obvious that one may be used in a manner as previously described for the illustrative embodiment shown in Fig. 1.

A mathematical analysis of the alternative arrangement shown in Fig. 3 as it affects the gain of the signal channel, yields the following expression:

(3) $$\frac{E_0}{(S)\alpha_i} = \frac{\mu W}{P+(W)\left(1+\frac{\mu\delta\alpha_i}{R_2}\right)}$$

Assuming conditions of maximum gain so that $$P \ll \left(1+\frac{\mu\delta\alpha_i}{R_2}\right)$$

and letting $$\frac{\mu\delta\alpha_i}{R_2} \gg 1$$

Equation 3 may be simplified to $$\frac{E_0}{S} = \frac{R_2}{\delta}$$

From Equation 3, it may be noted that the EFB amplifier acts as a low-pass filter which may be incorporated into the band-pass of the signal channel. If the band-pass of the EFB amplifier is broadened and maximum sensitivity for $E_0$ is obtained, it is apparent that the sensitivity of $E_0$ is limited by values of $R_2$, the series resistance, and $\delta$, the coil coefficient, and is independent of EFB amplifier loop gain or magnetometer bridge sensitivity.

Besides effecting a degree of economy in components, the principal advantage of this arrangement is a slightly greater stability within the EFB amplifier to changes in B+ and filament supply voltages, due to the wider band feedback loop of the EFB amplifier. However, this particular embodiment is somewhat more susceptible to noise, a majority of which is microphonic in origin.

The dynamic operation of the automatic earth field balance control system may be likened to the operation of any feedback amplifier or servo system wherein the output is fed back to the input stage in opposition to the input signal. With respect to Fig. 1, assume that the detector magnetometer element 18 is introduced into an ambient magnetic field which has incrementally increased in magnitude. The detector magnetometer bridge 11 will be proportionately unbalanced according to the incremental increase, and a representative spike signal as indicated in Fig. 1 by the waveform in dotted line will be evidenced. This single-ended spike signal is applied to a rectifier circuit 20 comprising a peak detector and a clamper, having diodes 19 and 21, respectively, in the output cathode circuits of which are developed positive voltage levels. The output voltage of diode 19 is proportional to the magnitude of the positive spike; the output voltage of diode 21 is proportional to the magnitude of the negative spike. Hence, after suitable RC filtering, the original signal emerges as two positive voltage levels, respectively appearing at the grids of the push-pull EFB amplifier 30. The difference in these voltage levels, which is directly proportional to the unbalance existing in the detector magnetometer bridge, is subsequently converted into a low impedance push-pull output voltage level, designated as $E_2$ in Fig. 2, and appears across the cathodes of push-pull cathode follower 40. The application of the voltage $E_2$ in proper amplitude and polarity to the EFB coil through series resistances 52 and 53 generates a current which creates a flux according to the expression $$F = \frac{E_2}{R_2}\delta$$

the flux thereby serving to substantially detract the earth's magnetic flux flowing within the Permalloy strip 17 of the detector element. An incremental input error voltage $E_1$, developed according to the expression $E_1 = (H-F)\alpha_1$, continually exists during the inventive system's operation as in conventional feedback or servo loop operation. Thus, the inventive earth field balance control system serves to continually supply a feedback voltage which is selectively degenerative to the lower frequency components of magnetic field signal, thereby effecting cancellation or neutralization of the earth's magnetic field gradient. It is of pertinence to note that the inventive apparatus is continuously operable in ambient earth's magnetic fields existing in magnitudes up to a maximum of approximately 70,000 gammas with a total peak-to-peak spike signal unbalance not exceeding 20 percent. The definitions of the terms contained in the expressions denoted above are as previously defined.

Thus, the automatic earth's field balance control system is deemed to substantially enhance the operation of magnetometer instruments incorporating the inventive system. Manual and mental operations on the part of the operator are eliminated, permitting not only greater operational efficiency achieved through uninterrupted operation of a magnetometer instrument proper, of special importance in aircraft installations, but also, the full attention of the operator may now be devoted to the discernment of magnetic anomaly signals. In addition, the instant invention provides for a frequency bandpass characteristic favorable to the passage of magnetic anomaly signals such as the response from a submarine, but rejects interfering magnetic noise signals, which originate in geological formations and aircraft maneuvers.

A table of illustrative component types and suggested values used in one such embodiment hereinbefore described is herewith submitted:

| Component: | Type or value |
|---|---|
| 13 | 700 cycles, Sec: 16 v. R.M.S. |
| 14, 15, 16 | 2000 turns. |
| 17 | Permalloy strip, 4.7x0.125x0.014 inches. |
| 19, 21 | 6AL5. |
| 33, 34 | 5879. |
| 41, 42 | 5814. |
| 23, 49 | 0.1 $\mu f$. |
| 24, 26, 38, 39 | 1 meg. |
| 25, 27 | 0.0022 $\mu f$. |
| 28, 29 | 2.0 $\mu f$. |
| 31, 32 | 2 meg. |
| 35, 36 | 0.01 $\mu f$. |
| 37, 43, 44 | 20K. |
| 38, 39, 47, 48 | 100K. |
| 45, 46 | 0.047 $\mu f$. |
| 51 | 5K. |
| 52, 53 | 10K. |

$K = 1000$

Obviously many modifications and variations of the present inveniton are possible in the light of the above teachings. It is therefore to be understood that within the scope of the appended claims the invention may be practiced otherwise than as specifically described.

What is claimed is:

1. An automatic earth field balance control system for use with magnetic anomaly detecting apparatus comprising, detector magnetometer means providing in the output thereof asymmetrical alternating spikelike output signals in the presence of an ambient earth magnetic field, a rectifier coupled to said detector magnetometer means to develop unilateral voltage levels proportional to the alternating excursions of said spikelike output signals, a low-pass filter connected to said rectifier to provide filtering of said unilateral vloatage levels, said low-pass filter having an upper frequency cutoff point which is below a predetermined frequency range containing magnetic anomaly signals of interest, an amplifier connected to said low-pass filter and including feedback means connected to said detector magnetometer means to furnish a feedback voltage derived from said unilateral voltage levels, whereby said feedback voltage is selectively degenerative to low frequency components of magnetic field signals occurring below said cutoff point to effect substantial cancellation of the ambient earth magnetic field but renders the favorable passage of said magnetic anomaly signals of interest occurring above the cutoff point to the detecting apparatus.

2. An automatic earth field balance control system for a magnetometer comprising, a detector magnetometer bridge including a driving source therefor, said bridge operable during unbalance thereof to develop an asymmetrical alternating spikelike output signal in the presence of an ambient earth magnetic field, rectifier means comprising a peak detector and a clamper jointly responsive to convert said signal into unilateral voltage levels, an amplifier means connected with said rectifier means for amplifying said unilateral voltage levels, said amplifier means having an output circuit connected to said bridge for application thereto of a feedback voltage deriving from said unilateral voltage levels and developed in said output circuit, whereby application of said feedback voltage effects substantial continual cancellation of said ambient earth magnetic field in said bridge to thereby reestablish balance thereof.

3. An automatic earth field balance control system for a magnetometer comprising, a detector magnetometer bridge including a drivng source therefor, said bridge operable during unbalance thereof to develop an asymmetrical alternating spikelike output signal in the presence of an ambient earth magnetic field, rectifier means comprising a peak detector and a clamper jointly responsive to convert said signal into unilateral voltage levels, an amplifier connected to said rectifier means for amplifying said voltage levels, and a cathode follower directly coupled with said amplifier means, said cathode follower having an output circuit connected to said bridge for application thereto of a feedback voltage deriving from said unilateral voltage levels and developed in said output circuit, whereby application of said feedback voltage effects substantial continual cancellation of said ambient earth magnetic field in said bridge.

4. An automatic earth field balance control system for a magnetometer comprising, a detector magnetometer bridge including a driving source therefor, said bridge operable during unbalance thereof to develop an asymmetrical alternating spikelike output signal in the presence of an ambient earth magnetic field, rectifier means comprising a peak detector and a clamper jointly responsive to convert said signal into unilateral voltage levels, amplifier means including a low-pass filter operatively interposed between said rectifier means and amplifier means, and a cathode follower directly coupled with said amplifier means, said cathode follower having an output circuit connected to said bridge for application thereto of the feedback voltage developed in said output circuit, whereby application of said feedback voltage effects substantial continual cancellation of said ambient earth magnetic field in said bridge.

5. An automatic earth field balance control system for use with magnetic anomaly detecting apparatus comprising, a detector magnetometer bridge comprising, a first magnetometer coil and a second magnetometer coil coaxially mounted about a strip of magnetically saturable core material and oriented so that the common axes thereof are maintained substantially coincident with the earth magnetic field, a transformer provided with a source of excitation and having a center-tapped secondary winding, said first and second magnetometer coils electrically interconnected with said center-tapped secondary winding to form four arms of said bridge, a third coil coaxially mounted about said strip of magnetically saturable core material, said bridge operable during unbalance thereof to develop an asymmetrical spikelike output signal in the presence of said earth magnetic field, rectifier means responsive to convert said spikelike signals into unilateral voltage levels, a resistive-capacitive low-pass filter means having an upper frequency cutoff point which is below a predetermined frequency range containing magnetic anomaly signals of interest, amplifier means operably electrically connected to said rectifier means through a resistive portion of said filter means, and cathode follower means responsive to said amplifier means having an output circuit jointly connected to said third coil and to the input of said amplifier means through a capacitive portion of said filter means for application of a degenerative feedback voltage derived from said unilateral voltage levels and developed in said output circuit, whereby said feedback voltage is selectively degenerative to low frequency components of magnetic field signals occurring below said cutoff point to effect substantial cancellation of the ambient earth magnetic field in said bridge but renders the favorable passage of said magnetic anomaly signals of interest occurring above the cutoff point to said detecting apparatus.

6. An automatic earth field balance control system for a magnetometer comprising, a detector magnetometer bridge comprising, a first magnetometer coil and a second magnetometer coil coaxially mounted about a strip of magnetically saturable core material and oriented so that common axes thereof are maintained substantially coincident with the earth magnetic field, a transformer provided with a source of excitation and having a center-tapped secondary winding, said first and said second magnetometer coils electrically interconnected with said center-tapped secondary winding to form four arms of said bridge, a third coil coaxially mounted about said strip of magnetically saturable core material, said bridge operable during unbalance thereof to develop an asymmetrical spikelike output signal having positive and negative excursions in presence of said earth magnetic field, rectifier means having a peak detector and a clamper connected to said bridge through a common resistance-capacitance coupling interposed therebetween, said peak detector having an output unilateral voltage level proportional to said positive excursions, said clamper having an output unilateral voltage level proportional to said negative excursions, amplifier means including a low-pass filtering means each respectively connected to said peak detector and said clamper and operatively interposed between said rectifier means and said amplifier means, and a cathode follower means directly coupled to said amplifier means and having an output circuit connected to said third coil for application thereto of a feedback voltage derived from difference of the unilateral voltage levels and developed in said output circuit, whereby said feedback voltage is effective to substantially continually cancel the earth magnetic field in said bridge and to thereby reestablish balance thereto.

7. In a magnetometer including a detector magnetometer bridge operable to produce spikelike output signals having positive and negative excursions, a rectifier circuit for converting said spikelike output signals into unilateral voltage levels comprising, a peak detector and a clamper electrically connected in shunt with said bridge to jointly respond thereby to said spikelike output signals, said peak detector having an output unilateral voltage level proportional to said positive excursion, said clamper having an output voltage level proportional to said negative excursion.

8. In a magnetometer including a detector magnetometer bridge operable to produce spikelike output signals having positive and negative excursions, a rectifier circuit for converting said spikelike output signals into unilateral voltage levels comprising, a peak detector and a clamper electrically connected in common to said bridge to jointly receive said spikelike output signals, said peak detector having an output unilateral voltage level proportional to said positive excursion, said clamper having an output unilateral voltage level proportional to said negative excursion, and low-pass filtering means, each respectively connected to said peak detector and said clamper.

9. In a magnetometer including a detector magnetometer bridge operable to produce spikelike output signals having positive and negative excursions, a rectifier circuit for converting said spikelike output signals into unilateral voltage levels comprising, a peak detector and a clamper each respectively having a diode, said peak detector and said clamper connected to said bridge through a common resistance-capacitance coupling interposed therebetween, a load impedance essentially series connected with the diode of said peak detector for developing a unilateral voltage level porportional to said positive excursion, a load impedance essentially shunt connected with the diode of said clamper, and low-pass filtering means each respectively connected to said peak detector and said clamper.

References Cited in the file of this patent

UNITED STATES PATENTS 2,727,206    Ryerson -------------- Dec. 13, 1955